Feb. 13, 1968  R. GUDMESTAD  3,368,428
WIRE CUTTING AND STRIPPING MACHINE
Filed Sept. 12, 1966  9 Sheets-Sheet 9

INVENTOR
RAGNAR GUDMESTAD
Lieber & Nilles
ATTORNEYS

United States Patent Office 3,368,428
Patented Feb. 13, 1968

3,368,428
WIRE CUTTING AND STRIPPING MACHINE
Ragnar Gudmestad, West Allis, Wis., assignor to Artos Engineering Company, Milwaukee, Wis., a corporation of Wisconsin
Filed Sept. 12, 1966, Ser. No. 578,580
13 Claims. (Cl. 81—9.51)

ABSTRACT OF THE DISCLOSURE

A wire cutting and stripping machine embodying transport mechanism coordinated with the cutting and stripping devices in a manner whereby the wire is held taut throughout its travel through the machine and during the successive automatic operations thereof.

Background

Such machines are commonly employed to cut desired lengths of insulated wire stock from a continuous supply and to remove a small portion of the insulation from each end of the wire so that a terminal may be attached thereto or a soldering operation performed. Machines of this type are particularly useful in rapidly cutting a large number of wires to a uniform desired length for use in wiring electric panels or other apparatus. Because of this, the rapidity and accuracy of operation of the wire cutting and stripping machine are primary considerations.

In the design and construction of such machines, it has been found most satisfactory to provide stationary cutting and stripping elements and to transport the wire into position for the cutting and stripping operation. To a great extent, therefore, the rapidity and accuracy of the wire cutting and stripping machine depends on the operation of the wire transport mechanism and the coordination of its operation with the operation of the cutting and stripping elements.

The operative cycle of the cutting and stripping machine may require that the transport mechanism advance the wire, hold the wire stationary, or retract the wire. Further, once the wire has been cut, there are, in effect, two pieces of wire that the transport mechanism must handle. At various points in the operative cycle of the machine, the transport mechanism may be required to move both pieces of wire in the same or opposite directions, or hold both pieces stationary.

The transport mechanism must also be coordinated with the cutting and stripping elements so that the wire is transported to the cutting and stripping elemens, moved in proper relation thereto when the cutting and stripping elements have engaged the wire, and transported away from these elements after the cutting and stripping operation has been performed. Further, the transport mechanism must be capable of moving all sizes and types of wire, from the very limp to the very stiff and springy types.

Summary

It is, therefore, an object of this invention to provide an improved wire cutting and stripping machine which is relatively simple and compact in construction and highly efficient in operation.

It is a further object of this invention to provide a wire cutting and stripping machine having improved means for transporting the wire to, through, and away from the cutting and stripping zones of the machine.

Yet another object of the present invention is to provide a wire cutting and stripping machine wherein the transport mechanism for the wire is closely coordinated with the cutting and stripping elements of the machine to lend rapid and accurate operation to the machine.

Still another object of the present invention is to provide a machine for cutting and stripping insulated wire stock including a main support or frame therefor and a driving means for the machine mounted on the support. Wire cutting and stripping elements, which may be in the form of sharpened blades or knives, are also carried by the support. Stripping lever means for gripping and stripping the wire stock are operatively associated with the cutting and stripping blades. A wire feed means driven by the driving means is provided in the machine to transport the wire stock through the machine. A wire guide, which is movable toward and away from the cutting and stripping blades, is provided to guide the wire between the blades as it is moved through the machine. Cam and eccentric means driven by said driving means operate the above components in timed relation to transport the wire stock through the machine, and to cut and strip the same.

The drawings

These and other objects and advantages will appear hereinafter as this disclosure progresses, reference being had to the accompanying drawings in which.

*Detailed description*

Figure 1:
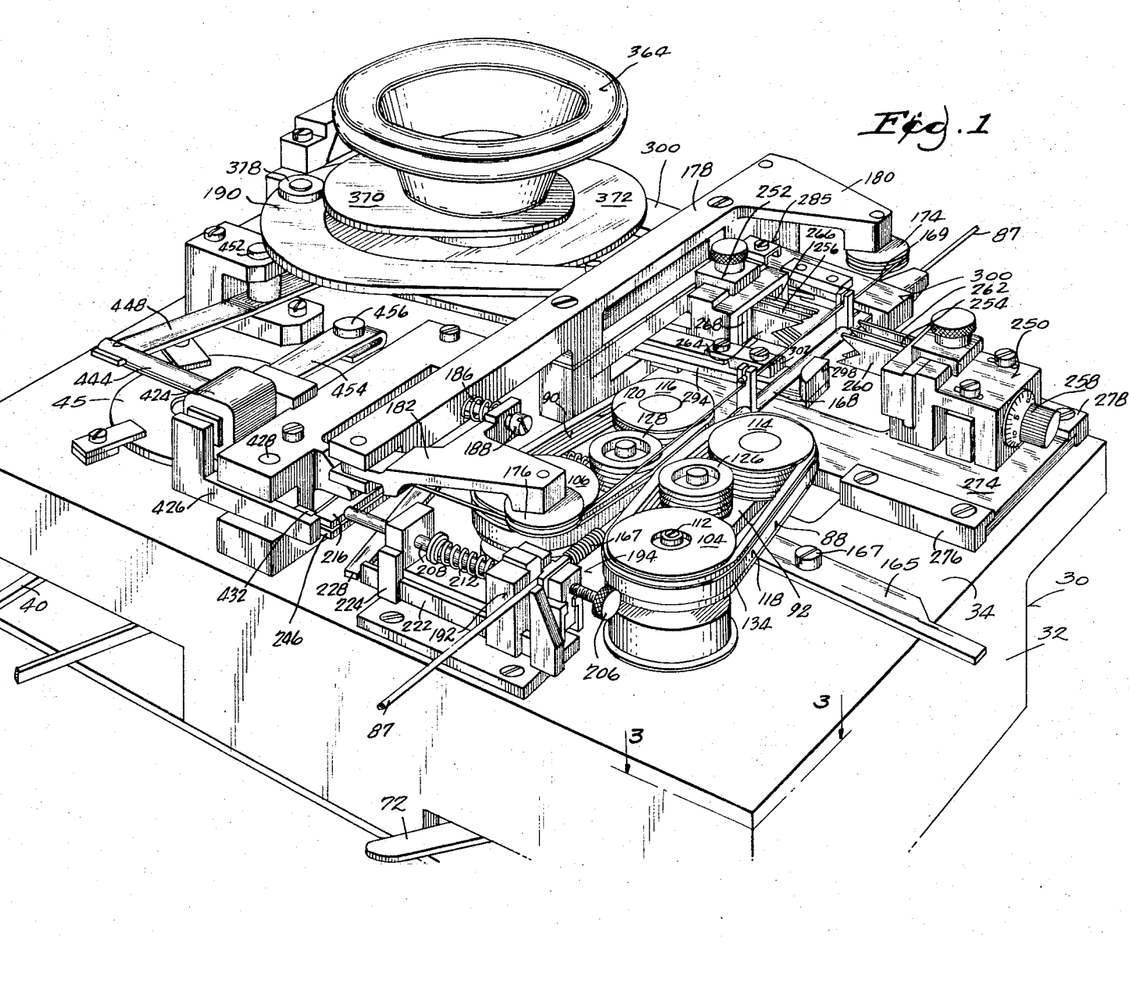
FIGURE 1 is a perspective view of the wire cutting and stripping machine of the present invention.

Referring now to FIGURE 1, there is shown therein a wire cutting and stripping machine of the present invention indicated by the numeral 30. Wire cutting and stripping machine 30 includes a main support or frame 32 having the operative components mounted on the upper surface or deck 34 thereof.

Figures 2, 23:
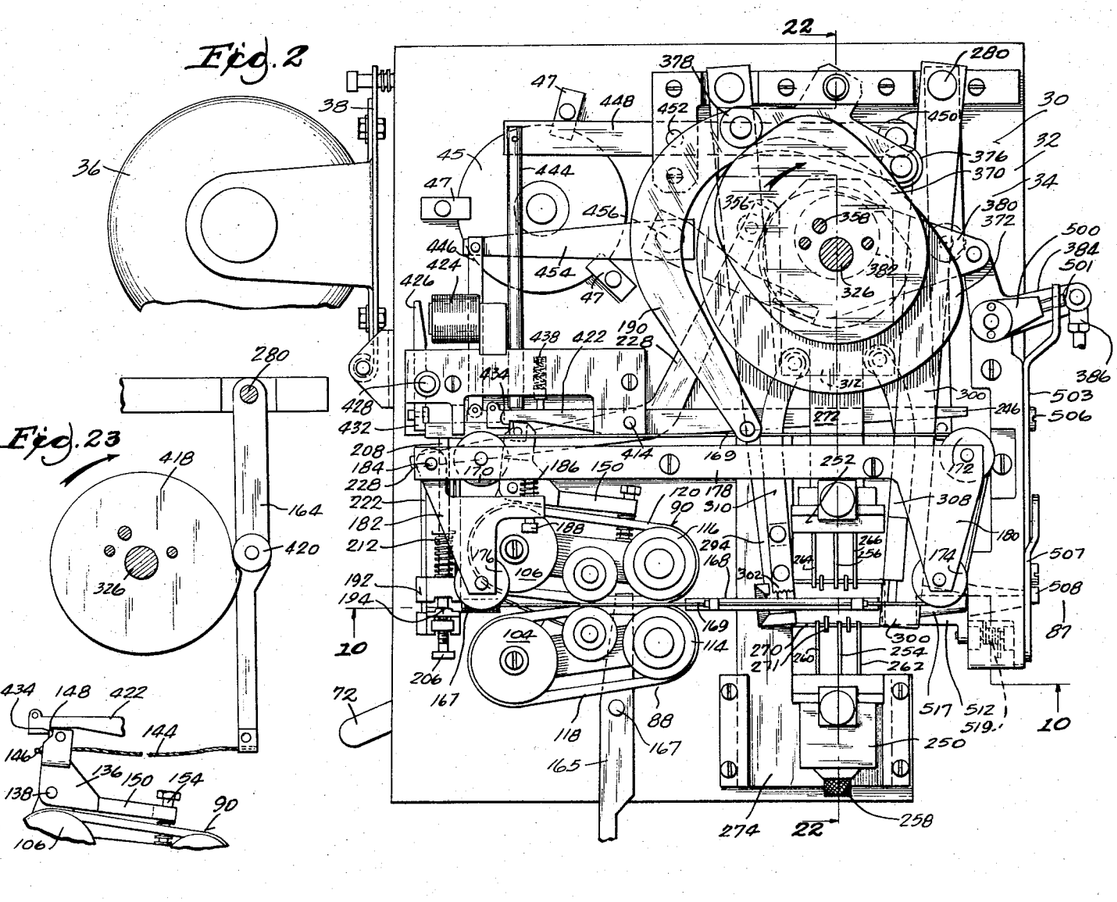
FIGURE 2 is a plan view of the wire cutting and stripping machine.
FIGURE 23 is a fragmentary plan view of one of the cams mounted on the cam shaft showing its shape and portions of the wire cutting and stripping machine operatively associated therewith.

FIGURE 2 is a plan view of deck 34, showing in detail, the layout of the components on the deck. In the following description, certain of the components will be described with reference to the orientation of the wire cutting and stripping machine as shown in FIGURE 2; that is, the two sides of the machine may be referred to as the left hand or right hand side while the two ends may be referred to as the front and rear ends.

Figures 3, 4:
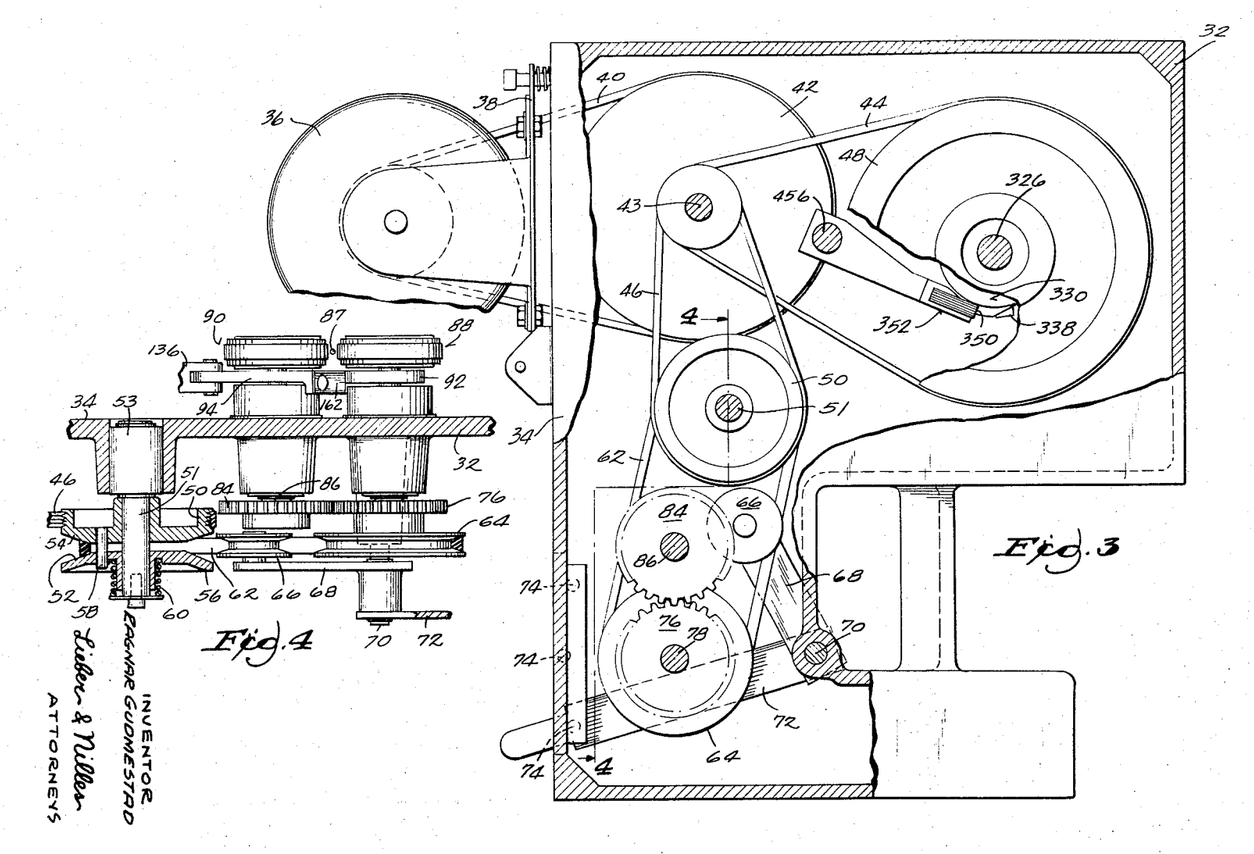
FIGURE 3 is a cross sectional view of the main support or frame of the wire cutting and stripping machine taken just below the deck or upper surface of the frame, as indicated by the section line 3—3 of FIGURE 1, showing in detail the power source and driving means of the wire cutting and stripping machine.
FIGURE 4 is a partial sectional view showing, in detail, several driving elements of the wire cutting and stripping machine.

Wire cutting and stripping machine 30 is powered by a power source and drive means mounted on frame 32 under deck 34. FIGURE 3 is a horizontal cross sectional view taken just below deck 34 and shows, in detail, this power source and drive means. A motor 36 is mounted on the left hand side of frame 32 and serves as a power source for the wire cutting and stripping machine 30.

The motor may be fastened on a spring loaded hinged bracket 38 which may be adjusted to provide the proper tension to drive belt 40. Belt 40 connects motor 36 to idler pulley 42 which is mounted on shaft 43 journalled in bearing 45 in deck 34. Idler pulley 42 drives two output belts 44 and 46. As shown in FIGURE 2, cage 45 containing the bearing for shaft 43 is held in place by three hold down tabs 47. These tabs may be loosened to shift the position of bearing 45 and pulley 42 to adjust the tension on output belts 44 and 46. (See FIGURE 3.)

One of the output belts 44 is connected to the input member 48 of a clutch and will be described hereinafter. The other belt is connected to pulley 50 mounted on shaft 51 journalled in bearing 53 in deck 32 (see FIGURE 4). Shaft 51 contains a variable diameter pulley 52 mounted coaxially with pulley 50. Variable diameter pulley 52 consists of a stationary flange 54 and a movable flange 56, which may be moved toward or away from stationary flange 54 along shaft 51 to vary the diameter of pulley 52. Pin 58 rotatably locks the two flanges together. Movable flange 56 is urged toward stationary flange 54 by spring 60. Movable flange 56 is urged away from stationary flange 54 by the tension of belt 62 strung between variable pulley 52 and pulley 64.

The tension of belt 62 is altered by idler 66. Idler 66 is mounted on arm 68 which is pivoted on shaft 70 located in frame 32. A lever 72 is fastened to arm 68 to pivot the arm about shaft 70. As arm 68 is pivoted, the position of idler 66 is shifted, altering the tension belt 62. For example, as lever 72 is moved forward, as shown in FIGURE 3, idler 66 is moved to the left, decreasing the tension in belt 62 and allowing movable flange 56 to move toward stationary flange 54. This increases the diameter of pulley 52 and the speed at which belt 62 drives pulley 64. A plurality of holes 74 may be provided in frame 32 to engage a projection on lever 72 and serve as stops for the lever to provide three speeds of operation for pulley 64.

Figures 6, 7, 8, 10:
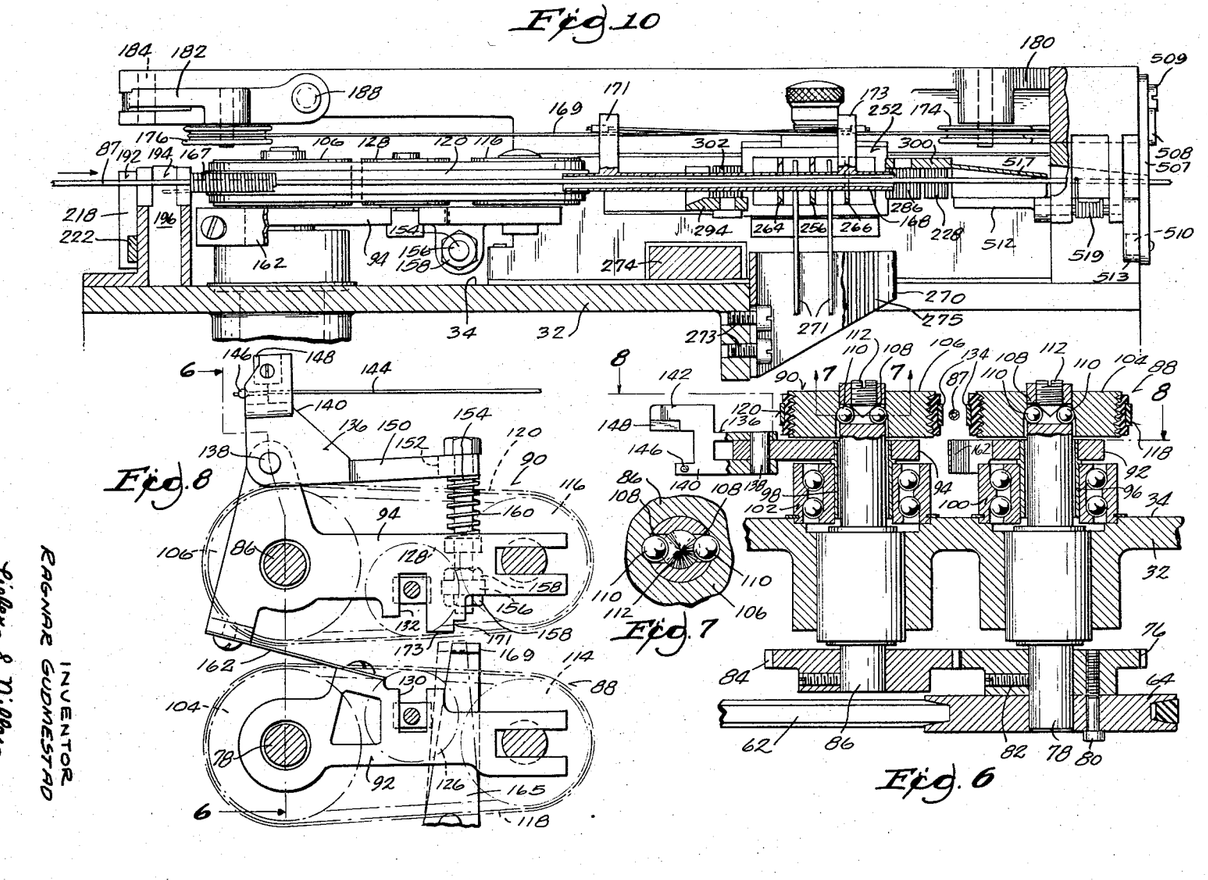
FIGURE 6 is a partial vertical cross sectional view taken along line 6—6 of FIGURE 8 showing the connection of the wire feed means to the driving means of the wire cutting and stripping machine.
FIGURE 7 is a partial cross sectional view, taken along line 7—7 of FIGURE 6, showing in detail a device for locking the wire feed means to the driving means.
FIGURE 8 is a partial top view of the wire feed means taken along line 8—8 of FIGURE 6 and showing in detail certain elements employed to operate the wire feed means.
FIGURE 10 is a partial view of the wire cutting and stripping machine taken generally along a vertical plane including the path of the wire as it is transported through the machine.
Figure 9:
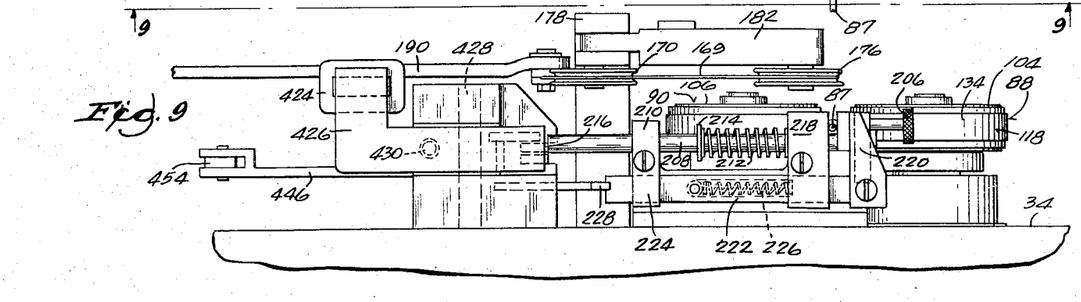
FIGURE 9 is a partial side view of the wire cutting and stripping machine taken along the line 9—9 of FIGURE 5 and showing in detail certain means to lock and hold the wire during portions of the operational cycle of the machine.

Pulley 64 is keyed to gear 76 coaxially mounted on shaft 78 by bolt 80 as shown in FIGURE 6. Gear 76 is pinned on shaft 78 by set screw 82. Gear 76 engages an identical gear 84 mounted on shaft 86 so that pulley 64 rotates both shafts 78 and 86 at identical speeds.

Shafts 78 and 86 drive a pair of wire feed means which selectively engage wire stock 87 to transport it through wire cutting and stripping machine 30. These means are generally indicated by the numerals 88 and 90 and are positioned on deck 34 on either side of wire 87. Such means include frame members 92 and 94 respectively. As shown in FIGURE 6, frames 92 and 94 each have a downwardly extending flange, 96 and 98 respectively, coaxial with shafts 78 and 86 which engage the inner races of bearings 100 and 102. The outer races of bearings 100 and 102 are mounted in deck 34. Frames 92 and 94 may thus pivot about the axis of shafts 78 and 86.

The upper end of shafts 78 and 86 contain driving pulleys 104 and 106 keyed thereto. Such a key may take the form of holes 108 drilled through the upper ends of shafts 78 and 86 containing balls 110 which fit into grooves in the bores of pulleys 104 and 106. Balls 110 are held in the grooves in pulleys 104 and 106 by the conical ends of set screws 112 as shown in FIGURE 7. Thus, when shafts 78 and 86 are rotated by belt 62, pulleys 104 and 106 are also rotated. As viewed in FIGURE 8, shaft 86 is rotated in a counterclockwise direction and shaft 78 is rotated in a clockwise direction.

Figure 5:
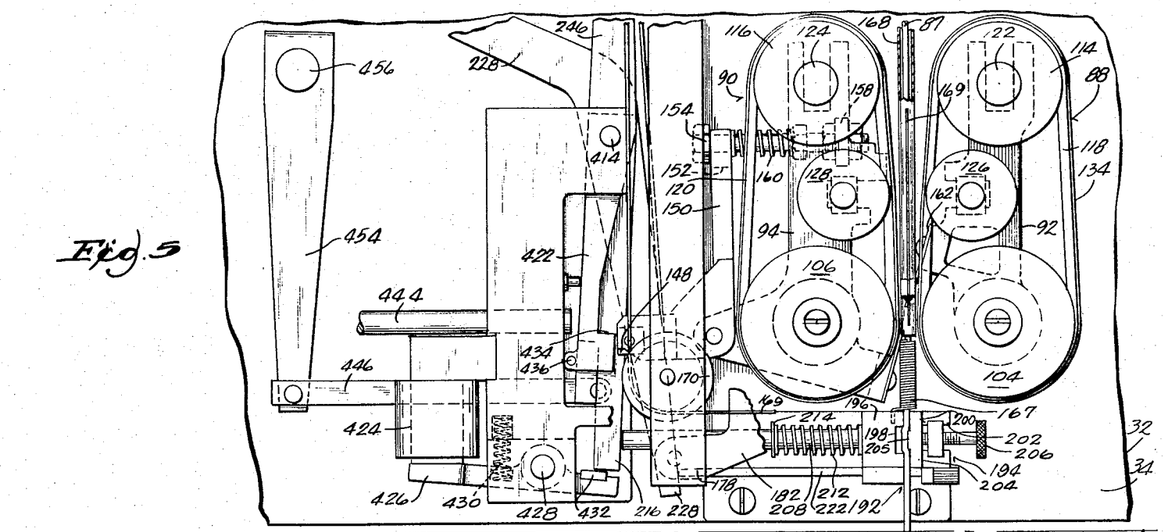
FIGURE 5 is a partial top view of the wire cutting and stripping machine showing a wire feed means for transporting the wire stock through the cutting and stripping machine.

As will be seen from FIGURE 5, driving pulleys 104 and 106 rotate driven pulleys 114 and 116 through belts 118 and 120. Driven pulleys 114 and 116 are adjustably mounted on the ends of frames 92 and 94, the ends of frames 92 and 94 being slotted to receive a flattened portion of shafts 122 and 124 on which pulleys 114 and 116 are rotatably journalled. A nut on the lower end of each shaft permits the driven pulley 114 and 116 to be adjustably affixed on frames 92 and 94 to vary the tension in belts 118 and 120.

Also, the line of contact between the belts and the wire may be adjusted by idler pulleys 126 and 128 which are movable outwardly and inwardly in slots 130 and 132 on frames 92 and 94 to thereby adjust the line of contact and keep the wire in a straight line.

As shown in FIGURE 6, the portion of belts 118 and 120 which engage wire 87 may be protected by a replaceable insert 134 which is mounted on the outer periphery of the belts. When driving pulleys 104 and 106 are rotated, belts 118 and 120 are driven so that the opposing surfaces of each of the belts move from left to right. In normal operation, pulleys 104 and 106 are continuously rotating so that belts 118 and 120 are constantly driven.

Wire feed means 88 and 90 are pivoted in the bearings 100 and 102 toward each other to cause belts 118 and 120 to engage wire 87 and away from each other to cause belts 118 and 120 to disengage wire 87. The position of wire feed means 88 and 90 in the wire engaging state is shown in FIGURES 1 and 2 of the drawing, while the position of means 88 and 90 in the disengaged state is shown in FIGURES 5 and 8. Means 88 and 90 are moved toward each other by a cable operated lever 136 connected to wire feed means 90. Specifically, referring to FIGURE 8, lever 136 is mounted on shaft 138 journalled in a projection on frame 94. One arm 140 of lever 136 extends in a generally perpendicular direction from frame 94 and terminates in a U-shaped member 142, as seen in FIGURE 6. The lower portion of member 142 contains a hole to receive cable 144 which is retained therein by split-ball 146. The upper portion of U-shaped member 142 contains a square hardened metal insert 148 which engages a notch 434 in bar 422.

The other arm 150 of lever 136 extends generally parallel to frame 94 and terminates in an elongated hole 152. A bolt 154 extends through hole 152 and is mounted on frame 94 in flanges 156 by nuts 158. Flanges 156 may be most clearly seen in FIGURE 10 which shows a side view of frame 94. Arm 150 is biased against the head of bolt 154 by spring 160 which surrounds the bolt between arm 150 and flange 156.

Wire feed means 88 is interconnected with wire feed means 90, so the two means are swung toward and away from the wire 87 in unison, by spring steel strap 162 fastened to both frame 92 and frame 94. Spring steel strap 162 also forces wire feed means 80 and 90 away from wire 87 when the means are not otherwise acted upon.

To move wire feed means 88 and 90 together, cable 144 is moved to the right by a cam operated lever 164 (see FIGURE 23) which is hereinafter described in detail. The movement of cable 144 causes lever 136 to pivot wire feed means 90 on bearing 102 towards wire 87 located between the wire feed means. Wire feed means 88 is similarly pivoted on bearing 100 toward wire 87 by strap 162. Inserts 134 in the belt contact the wire 87, and the pressure exerted on the wire by wire feed means 88 and 90 through the action of cable 144 and strap 162 causes the inserts to engage or grip the wire and transport it from left to right through wire cutting and stripping machine 30. As shown in FIGURE 2, the portion of belt insert 134 between idlers 126, 128 and driven pulleys 114, 116 contact wire 87.

Spring 160 allows arm 136 to continue to pivot on shaft 138 even though the wire feed means 88 and 90 have engaged wire 87, thus permitting hardened metal insert 148 to be placed in locking notch 434 in bar 422 to retain the wire feed means in the wire engaging position. This allows the tension on cable 144 to be relaxed without affecting the wire feed means 88 and 90.

Movement of the end of bar 422 and locking notch 434 rearward disengages insert 148 from the notch and allows lever 136 to pivot wire feed means 90 away from wire feed means 88 to disengage wire 87. Strap 162 causes a similar action on wire feed means 88 and retains wire feed means 88 and 90 in the disengaged position.

Lever 165 is pivotally mounted on deck 34 by pin 167 so that the end 169 is positionable either in notch 171, as shown by the solid lines in FIGURE 8, or opposite surface 173, as shown by the dotted lines in FIGURE 8. When the end of lever 165 is positioned in notch 171, the operation of the wire feed means 88 and 90 is not affected. However, when the end of lever 165 is positioned opposite surface 173, the wire feed means are prevented from coming together and engaging the wire. This permits the machine 30 to run through its operative cycle without transporting wire so that its operation may be checked or adjustments made.

Wire 87 is guided in its entry between wire feed means 88 and 90 by tube 167 mounted behind the wire feed means. As shown in the figures, tube 167 may take form of a tightly coiled stiff spring.

Wire 87 is guided as it leaves wire feed means 88 and 90 by wire guide means 168. Wire guide means 168 consists of a tube which is movable from left to right along the axis of travel of wire 87. In its extreme right position, as shown in FIGURE 10, the tube is moved from between wire feed means 88 and 90, allowing the wire feed means to move together to engage wire 87 and transport it through tube 168 and wire cutting and stripping machine 30. In the position shown in FIGURE 10, tube 168 is between the wire cutting and stripping elements which are held open as the wire 87 is being transported. When tube 168 is located in its extreme left position the tube is located between wire feed means 88 and 90 as shown in FIGURE 5. This occurs after the desired length of wire has been transported through the machine and during the wire cutting and stripping operation.

Tube 168 is moved between its left and right positions by means of an endless cable 169 strung on a generally rectangular course defined by four sheaves 170, 172, 174 and 176. Tube 168 contains supports 171 and 173 at either end thereof containing holes for receiving the ends of cable 169. The ends of cable 169 may be crossed, as shown in FIGURE 10, to aid in the tensioning of the cable as hereinafter described. The ends of cable 169 are fastened in supports 171 and 13 by small tubes swaged thereon. (See FIGURE 2.)

Sheaves 170, 172, 174 and 176 are mounted on a base 178 affixed to deck 34 of frame 32, to the rear of, but parallel to, the path of wire 87. Two of the sheaves 170 and 172 are mounted on the base itself while the remaining sheaves are mounted on arms 180 and 182 extending from base 178. Arm 182 is pivotally mounted on pin 184 in base 178 and is biased by spring 186 into a position to place sufficient tension through sheave 176 on cable 169 to retain the cable in the sheaves. Spring 186 surrounds stop screw 188.

Cable 169 is reciprocally moved on the course defined by sheaves 170, 172, 174 and 176 by a crescent shaped lever 190, the end of which is fastened to cable 169. The end of lever 190 is moved in a shallow arc by cams, operatively associated therewith as hereinafter described, which move the cable 169 and the tube 168 between the left and right positions. The tension adjustment provided by arm 182 compensates for any strains placed on cable 169 due to the arcuate movement of the end of lever 190.

In order to provide accurate cutting and stripping of the wire it is essential that the wire be clamped in position before being transported, after being transported, and during portions of the cutting and stripping operation. To this end, several wire locking and holding means are provided in wire cutting and stripping machine 30.

Thus, wire cutting and stripping machine 30 contains a left hand wire holder 192 which holds wire 87 and prevents its movement while tube 168 is adavnced from its left position to its right position in preparation for transporting wire through the machine. The wire cutting and stripping machine also contains a left hand wire lock 194 and right hand wire lock 195 which lock the wire in position and prevent its movement after the desired length of wire has been transported through the machine.

The left hand wire holder 192 and left hand wire lock 194 are located in adjacent structures mounted on the left edge of frame 32. Left hand wire lock 194 contains a stationary anvil 196 extending in a vertical direction adjacent the path of wire 87. Anvil 196 is provided with a depression 198 in the face thereof. A wire locking member 200 is slideably mounted on extensions 202 of anvil 196 so as to be positioned on the other side of the path of wire 87 from anvil 196. As shown in FIGURE 1, the extensions 202 of anvil 196 may comprise a pair of rails which mate with corresponding grooves in wire locking member 200. Wire locking member 200 includes a hammer 204 mounted thereon provided with a projection 205 mating with the depression 198 in anvil 196. The position of hammer 204 on wire locking member 200 may be adjusted by thumb screw 206 to allow the lock to accommodate various sizes of wire.

Wire locking member 200 is further mounted on anvil 196 by a shaft 208 fastened to the locking member and extending through anvil 196 and through a support 210 to the rear thereof. Spring 212 surrounding shaft 208 between the rear of anvil 196 and stop washer 214 mounted on the shaft urges hammer 204 against the anvil so as to pinch wire 87 between the anvil and the hammer and force it into the depression 198 in the face of anvil 196. This provides a positive lock on wire 87 and prevents its movement. The lock on wire 87 provided by left hand wire lock 194 is released by a lever 440 abutting the end of shaft 208 which overcomes spring 212 to push hammer 204 away from anvil 196 to release wire 87.

Left hand wire holder 192 operates in a similar manner to restrain movement of wire 87. An anvil 218 is positioned adjacent the path of wire 87. A hammer 220, having bar 222 mounted in holes in the anvil and in rear support 224, is urged toward the anvil 218 by a spring 226 mounted in a slot on the inside of bar 222. Because anvil 218 does not contain a depression in its face, the restraining action of left hand wire holder 192 is less severe than that of left hand wire lock 194. Left hand wire holder 192 is released by a cam operated lever 228 abutting the end of bar 222 which pushes hammer 220 away from anvil 218.

Figures 11, 12, 13:
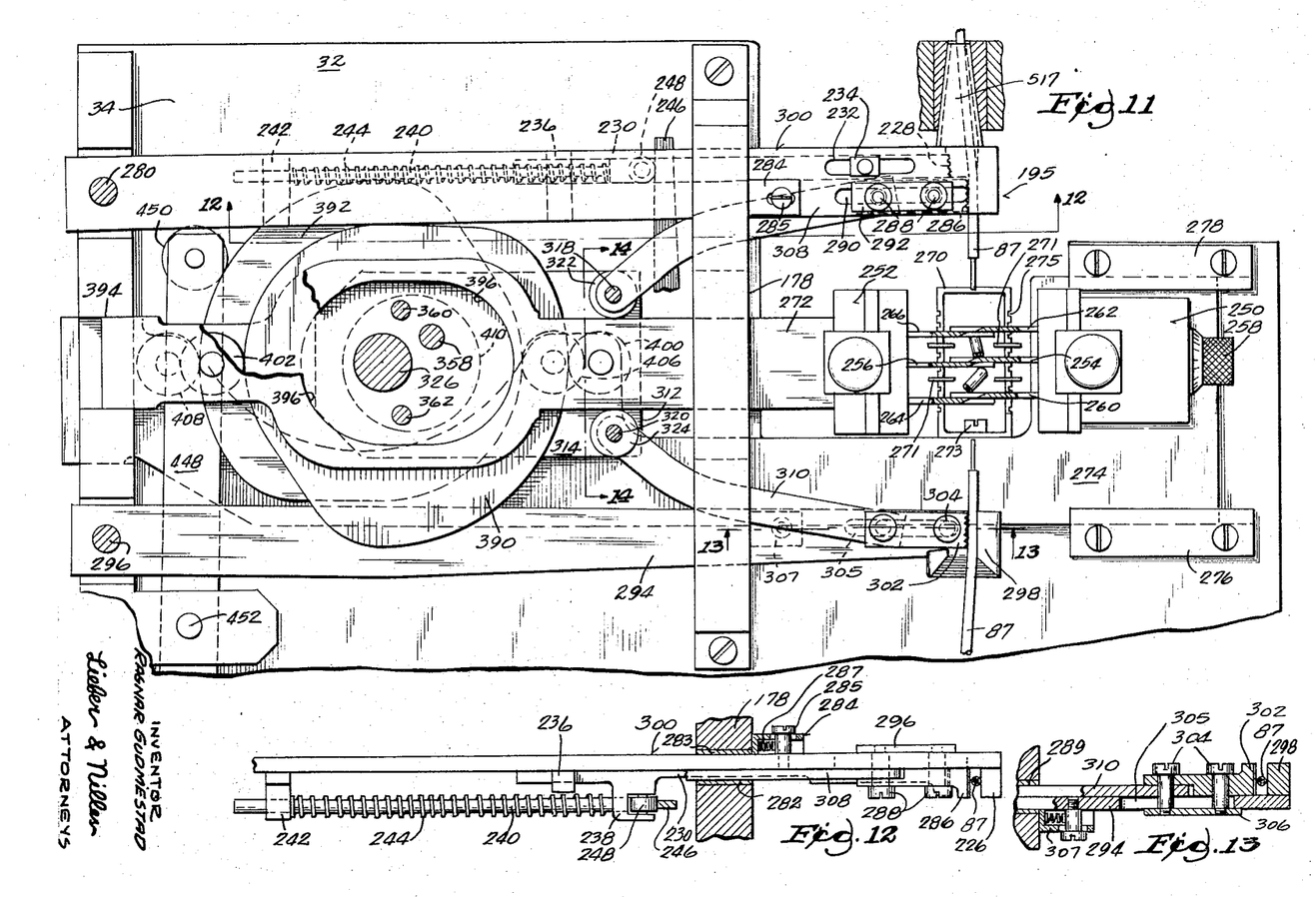
FIGURE 11 is a partial plan view of the wire cutting and stripping machine showing in detail the elements of the machine employed to cut and strip the wire.
FIGURE 12 is a partial horizontal view taken along line 12—12 of FIGURE 11, showing a portion of one of the stripping arms utilized to strip the insulation from the wire.
FIGURE 13 is a partial cross sectional view, taken along line 13—13 of FIGURE 11 showing a portion of the other stripping arm utilized to strip the insulation from the wire.

The right hand wire lock 195 is located ahead of the wire cutting and stripping elements adjacent the right edge of wire cutting and stripping machine 30. More specifically, the right hand wire lock is mounted on the right hand stripping arm 360 of the stripping elements to be described in detail hereinafter. As shown in FIGURES 11 and 12, right hand stripping arm 300 includes a downwardly extending anvil 226 at the outer, or forward, end thereof. Hammer 228 which forces wire 87 against anvil 226 to lock it in position is mounted on the under side of stripping arm 300. The hammer forms the end of strap 230 which is slideably retained on the underside of stripping arm 300 by a projection extending through elongated slot 232 and terminating in a retaining means 234 and by loop 236 surrounding the rear end of the strap. A downwardly extending boss 238 on strap 230 contains one end of shaft 240, the other end of which is retained in bracket 242. A spring 244 surrounding shaft 240 between boss 238 and bracket 242 urges strap 230 and hammer 228 toward anvil 226 to lock wire 87. Lever 246 coacting with roller 248 on boss 238 acts against spring 244 to move hammer 228 away from anvil 226 to release wire 87.

Figures 14, 19, 20, 21, 22:
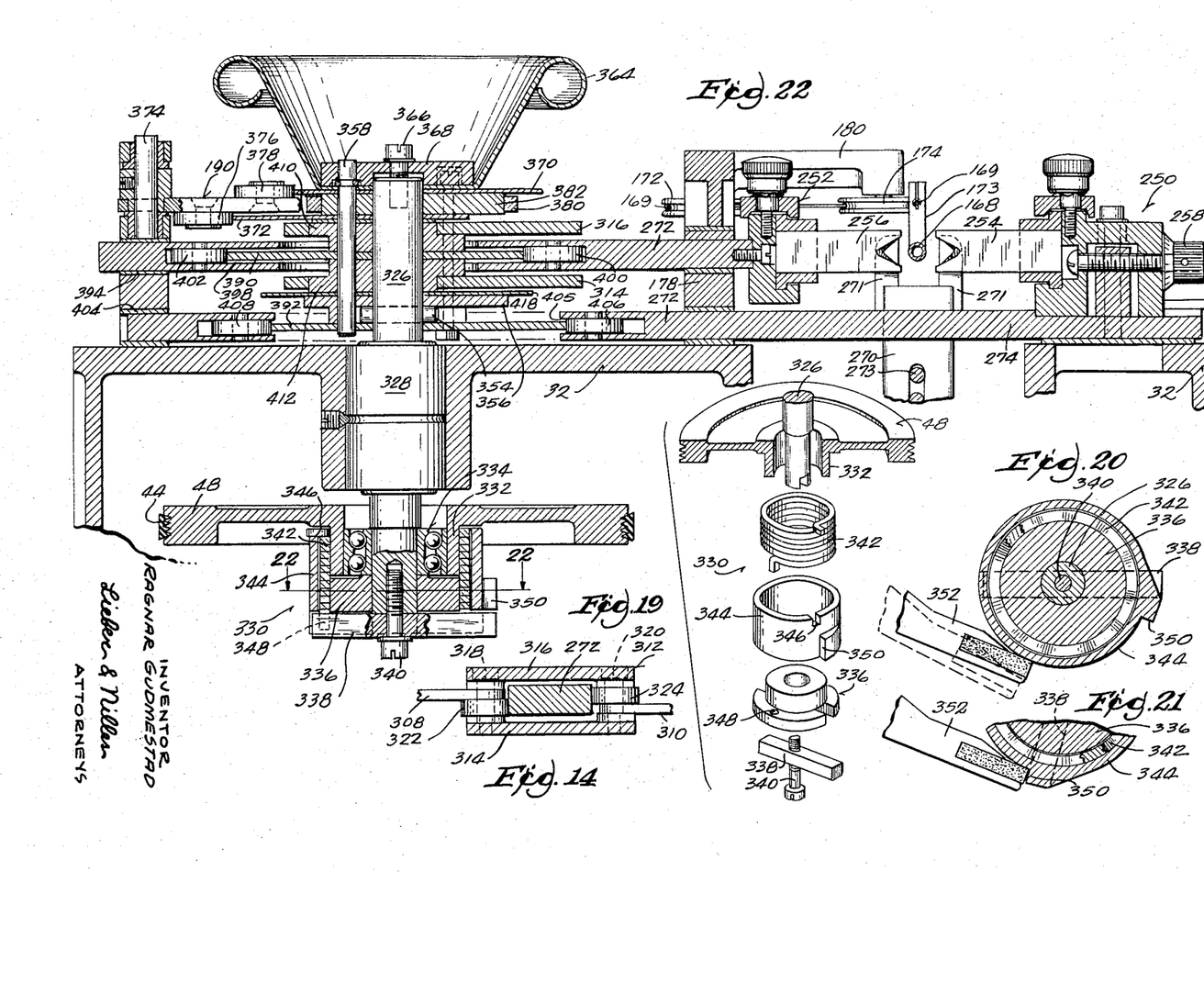
FIGURE 14 is a partial cross sectional view taken along line 14—14 of FIGURE 11 showing additional portions of the structure of the stripping arms.
FIGURE 19 is an exploded perspective view of a clutch utilized in the wire cutting and stripping machine to couple the drive means to a shaft which drives other components of the machine.
FIGURES 20 and 21 are detailed cross sectional views of the clutch showing it in the engaged and disengaged position, respectively.
FIGURE 22 is a vertical cross sectional view of the wire cutting and stripping machine taken along line 22—22 of FIGURE 2, showing in detail the shaft and the tier of cams mounted thereon.

The wire cutting and insulation severing elements of the wire cutting and stripping machine 30 comprise a plurality of notched blades, as shown in FIGURES 11 and 22, which are moved toward each other to cut wire 87 and sever the insulation thereon. The blades are mounted on a forward tool holder 250 and a rear tool holder 252. In the embodiment shown, each tool holder contains three blades, the center blade 254, 256 being the cutting blade and extending sufficiently far out of each tool holder to overlap the corresponding blade in the other tool holder and shear wire 87 when the tool holders are moved toward each other. However, these tool holders may contain only a single set of cutoff blades or they could contain any number of blades depending upon the work to be performed. The insulation severing blades 260, 262, 264 and 266 are located on either side of cutting blades 254 and 256 and extend out of the tool holders a lesser distance than the cutting blades so as to circumferentially sever the insulation on wire 87 when the tool holders are moved together. The position of cutting blade 254 and insulation severing blades 260 and 262 may be adjusted for different sized wire by altering the position of forward tool holder 250 by means of micrometer adjustment 258 which moves the tool holder 250 forward or rearward on plate 274. The lateral distance between the cutting blades and insulation severing blades along the path of travel of wire 87 may be adjusted by shims 268 (FIGURE 1) placed between the blades. The lateral distance between cutting blades 254 and 256 and the insulation severing blades 262 through 266 determines the amount of insulation which is severed from each end of wire 87.

As shown in FIGURE 11, a discharge chute 270 is bolted on frame 30 by bolts 273. Chute 270 permits the pieces of insulation stripped from wire 87 to be discharged from the machine. The edges of chute 270 contain slots 275 mounting upwardly extending plates 271 which remove any pieces of stripped insulation sticking to the blades as the blades and tool holders 250 and 252 move apart after cutting the wire and severing the insulation.

Rear tool holder 252 is mounted on bar 272 in base 178 for reciprocal movement toward and away from forward tool holder 250. The rear end of bar 272 is mounted in guide 394 on the rear edge of deck 34. Forward tool holder 250 is mounted on plate 274 which fits into slides 276 and 278 on deck 34. The rear end of plate 274 is mounted in guide 404 on the rear edge of deck 34. Plate 274 is cut away so as to lie along one side of hole 270. Both bar 272 and plate 274 are operatively associated with cams which provide their reciprocating action as hereinafter described.

The wire stripping means of wire cutting and stripping machine 30 comprise devices which engage the wire, after the cutting blades 254 and 256 have separated it into two portions and the insulation severing blades 260 through 266 have severed its insulation, and move the separated portions of the wire apart, so that the conductor is withdrawn from the severed insulation to expose its bare ends. A left hand stripping means and a right hand stripping means are provided for moving both portions of separated wire 87.

The right hand stripping means includes right hand stripping arm 300 previously mentioned in connection with right hand wire lock 195. Right hand stripping arm 300 is mounted along the right side of frame 32 of wire cutting and stripping machine 30. The arm is pivoted on pin 280 on the rear of frame 32 so as to be capable of swinging in a short arc from left to right along the path of wire 87. The arm 300 extends through slot 282 in base 178 which acts as a guide to the travel of the arm. Slot 282 may be lined with bearing material 283 to assist the movement of arm 300. The movement of arm 300 is braked or retarded by brake 284 mounted on the upper side of arm 300 which frictionally abuts base 178. The brake is held on arm 300 by bolt or machine screw 285 and against base 178 by spring 287.

Wire 87 is engaged by right hand stripping arm in much the same manner as right hand wire lock engages wire 87. That is, a gripper 286 is moved forward to pinch the wire between the gripper and anvil 226. Specifically gripper 286 is slideably mounted on the under side of stripping arm 30 by means of bolts 288 extending through slot 290 in the arm and fastened to retainer 292.

Left hand stripping arm 294 is similar in construction to right hand stripping arm 300, in that it is mounted on pivot 296 at the rear of frame 32 and is movable through a controllable arc in slot 289 of base 178 from left to right along the path of wire 87. However, as shown in FIGURE 13, anvil 298 on the forward end of arm 294 extends upward, and gripper 302 is slideably mounted on the top of the arm by bolts 304 extending through slot 305 in the arm and fastened to retainer 306 on the underside of the arm. Brake 307, similar in construction to brake 289 is also mounted on the underside of arm 294.

Right hand stripping means and left hand stripping means are driven links 308 and 310 which extend from a common mounting structure 312 to the grippers 286 and 302 on each of the stripping arms, 300 and 294. Specifically, link 308 extends from common mounting structure 312 to gripper 286 while link 310 extends from the mounting structure to gripper 302. Common mounting structure 312 comprises a pair of identical vertically spaced plates 314 and 316, the bottom one of which, 314, is shown in plan view in FIGURE 11. A cross-sectional view of common mounting structure 312 is shown in FIGURE 14. Links 308 and 310 are mounted at the forward corners of the plates by pins 318 and 320. Rollers 322 and 324 act as spacers and also allow the mounting structure to be moved reciprocally along bar 272. Link 308 is mounted below roller 322 as it extends from the common mounting structure 312 to gripper 286 mounted on the underside of stripping arm 300. Link 310 is mounted above roller 324 as it extends from the common mounting structure 312 to gripper 302 mounted on the upper side of stripping arm 294.

Common mounting structure 312 is reciprocally moved along bar 272 between a forward and a rearward position by means of eccentric cams, as hereinafter described. As the common mounting structure 312 moves forward, links 308 and 310 move grippers 286 and 302 forward in slots 290 and 305 against anvils 226 and 298 to engage wire 87. Common mounting structure 312 and links 308 and 310 continue to move forward after grippers 286 and 302 have engaged the wire. As the movement of the grippers is arrested by their abutment with wire 87, the continued forward motion of the links overcomes brakes 284 and 289 and pivots the stripping arms away from each other. Right hand stripping arm 300 is moved to the right while left hand stripping arm 294 is moved to the left. This moves the separated portions of wire 87 apart so that the conductor is withdrawn from the severed insulation and the bare ends of the conductor are exposed.

When common mounting structure 312 is moved rearward, links 308 and 310 initially operate to retract grippers 286 and 302 to disengage wire 87 and allow it to drop from the wire cutting and stripping machine. As common mounting structure 312 continues to move rearward the friction of brakes 284 and 289 is again overcome and stripping arms 300 and 294 are moved together in preparation for a succeeding stripping operation.

The operative parts of wire cutting and stripping machine 30 described above are driven by means of cams which are mounted in a tier on a common shaft 326. Shaft 326 is journalled in bearing 328 in the right rear corner of deck 34. Shaft 326 is driven through a clutch 330, the input member 48 of which is rotated by belt 44 driven by idler pulley 42. Numerous mechanisms may be employed as clutch 330, the embodiment of the invention, shown and described herein, employing a wrap-spring clutch.

Input member 48 has a collar 332 extending downwardly concentric with shaft 326. Collar 332 is mounted on the outer race of bearing 334. The inner race of bearing 334 is mounted on shaft 326 so that input member 48 is rotatable on the shaft. Clutch 330 also includes a bottom plate 336 mounted on the lower end of shaft 326 and abutting the aforementioned bearing. Plate 336 and shaft 326 are keyed together by key 338 which extends through notches in both the members and is fastened to shaft 326 by bolt 340. One end of key 338 protrudes beyond the periphery of hub 336.

Bottom plate 336 forms the output member of clutch 330. Coupling between the input member 48 and the output member, bottom plate 336, is provided by spring 342 which, when clutch 330 is engaged, wraps itself tightly around the bottom plate 336 and collar 332 to lock the two members together and engage the clutch. When clutch 330 is disengaged, spring 342 is unwrapped to a sufficient extent to release collar 332 and the bottom plate 336 and uncouple them. Spring 342 is wound during manufacture so that it is tightly wound in its normal state and its diameter in the wound state is less than the diameter of collar 332 an bottom plate 336. This assures that clutch 330 will engage when spring 342 is released to assume its normal position. A sleeve 344 surrounds spring 342 and retains one end thereof in notch 346. The other end of spring 342 is lodged in hole 348 in bottom plate 336. Sleeve 344 contains a stop 350 which, along with key 338, engages clutch operating lever 352 to control the operation of clutch 330.

Clutch 330 is held in the disengaged position by inserting clutch operating lever 352 in back of stop 350 on sleeve 344 and into the path of key 338 fitted in bottom plate 336 and shaft 326 as shown in FIGURE 21. This causes spring 342 to assume the unwound position and retains it in that position, thereby uncoupling collar 332 from bottom plate 336.

To engage clutch 336, clutch operating lever 352 is moved out of engagement with stop 350 and key 338. Spring 342 then contracts or winds up to its natural position which is of lesser diameter than collar 332 on input member 48 and bottom plate 336. The spring wraps around both collar 332 and bottom plate 336 and transmits the input power to bottom plate 336, causing shaft 326 to rotate. Stop 350 advances a short angular distance ahead of key 338 due to the winding of spring 342 as shown in FIGURE 20.

Clutch 330 is disengaged after one revolution which represents the operating cycle of the wire cutting and stripping machine 30. Clutch operating lever 352 is positioned so as to ride on the outer periphery of bottom plate 336 and sleeve 344 after the operating lever is initially disengaged from stop 350 and key 338. After clutch 330, and the input and output members thereof have rotated almost a complete revolution, clutch operating lever 352 engages stop 350 on sleeve 344. This stops the motion of sleeve 344 and causes spring 342 to unwind, as one end of the spring is fastened to the sleeve. The unwinding of the spring causes it to release collar 332 on input member 48 and disengages the clutch. Shaft 326, along with bottom plate 336 and key 338, continue to rotate due to their momentum. A short angular distance later the protruding end of key 338 strikes clutch operating lever 352 bringing shaft 326 to a halt after exactly one revolution.

The tier of cams is mounted on the upper end of shaft 326 by means of pin 354 inserted through the shaft and into a notch in cam 356 which is next to the lowest in the tier. The remainder of the cams are keyed to cam 356 by pin 358 which extends through cam 356 and the other cams in the tier, and the entire assembly is held together by means of bolts 360 and 362 which pass through all of the cams and are fastened in nuts on the lower side of the lowest cam in the tier. At the top of the tier of cams is mounted hand wheel 364 fastened to shaft 326 by bolt 366 and plate 368. Hand wheel 364 may be used to rotate shaft 326 by hand, if necessary.

Turning now to the individual cams in the cam tier, the uppermost cam 370, is used to operate crescent shaped lever 190 which moves wire guide tube 168 between its left and right positions. To insure positive operation of crescent shaped lever 190 throughout its entire operative cycle, cam 372, the third cam from the top of the tier, is also employed to control the motion thereof.

Crescent shaped lever 190 is pivotally mounted on pivot 374 on the rear edge of frame 32. A roller 376 is mounted on the end of crescent shaped lever 190 on its under side to engage cam 372. As shown in FIGURE 2, a roller 378 is mounted on the upper side of the lever between pivot point 374 and the end of crescent shaped lever 190 which is fastened to cable 196 to engage cam 370. The shape of cams 370 and 372 may best be seen in FIGURE 2. Rotation of shaft 326 and cams 370 and 372 in the clockwise direction, as viewed in FIGURE 2, causes the end of crescent shaped lever 190 fastened to cable 196 to move in a shallow arc and shift wire guide tube 168 between its left and right positions.

The second cam from the top of the tier may be used to operate a wire support mechanism as well as a collector or wire gathering apparatus for collecting the cut and stripped wires and depositing them in a trough for future use. The use of a wire gathering apparatus in conjunction with the wire cutting and stripping machine 30 of the present invention is optional and the apparatus forms no part of the present invention. If it is desired to use a wire gathering apparatus, a follower strap 380 is wrapped around cam 382 to drive operating levers 384 and 386. If it is not desired to use wire gathering apparatus, follower strap 380 may be omitted and a plain metal disc may be substituted for cam 382.

Cams 390 and 392 in the tier reciprocate the tool holders 250 and 252 toward and away from each other. The shape and operative action of these cams may best be seen in FIGURE 11, which shows them in plan view, and in FIGURE 22 which shows them in cross section.

Considering first rear tool holder 252, bar 272 attached thereto extends to the rear of wire cutting and stripping machine 30 and is mounted in a guide 394 on the rear edge of deck 34. The central portion of bar 272 contains an enlarged vertical hole 396 through which shaft 326 extends and a horizontal slot 398 in which cam 390 fits. Rollers 400 and 402 mounted on the edges of slot 398 engage the cam and provide reciprocal motion to bar 272 and rear tool holder 252 as cam 390 is rotated.

Plate 274, on which front tool holder 250 is mounted, extends along the left side of hole 270 and shaft 326 and terminates in a guide 404 on the rear edge of deck 34. Plate 274 contains a horizontal slot 405 in which cam 392 is free to rotate. A pair of projections from plate 274 mount rollers 406 and 408 which engage the cam and provide reciprocal movement to the front tool holder 252 as the cam 392 rotates. As shown in FIGURE 11, the lobes of the cams are diametrically opposed so that front tool holder 252 and rear tool holder 250 are moved toward each other and away from each other as the cams rotate.

Identical eccentric cams 410 and 412 drive the common mounting structure 312 for links 308 and 310 to operate left hand and right hand wire stripping means. The shape of eccentric cams 410 and 412 may be seen most clearly in FIGURE 11 which shows the eccentric cams in plan view. The rear portion of plates 314 and 316 which form common mounting structure 312, are provided with holes which identically match the eccentric cams 310 and 312 and thus permit the plates to receive the eccentric cams and act as followers. Eccentric cams 410 and 412, when rotated, drive plates 314 and 316 and links 308 and 310 forward along bar 272 to cause grippers 286 and 302 to engage wire 87 and strip the ends of its separated portions. These cams also drive the plates and links rearward along bar 272 to disengage wire 87. The operation of eccentric cams 410 and 412 and the left and right hand stripping means is described in additional detail in U.S. Patent No. 3,199,383.

Figures 15, 16, 17, 18:
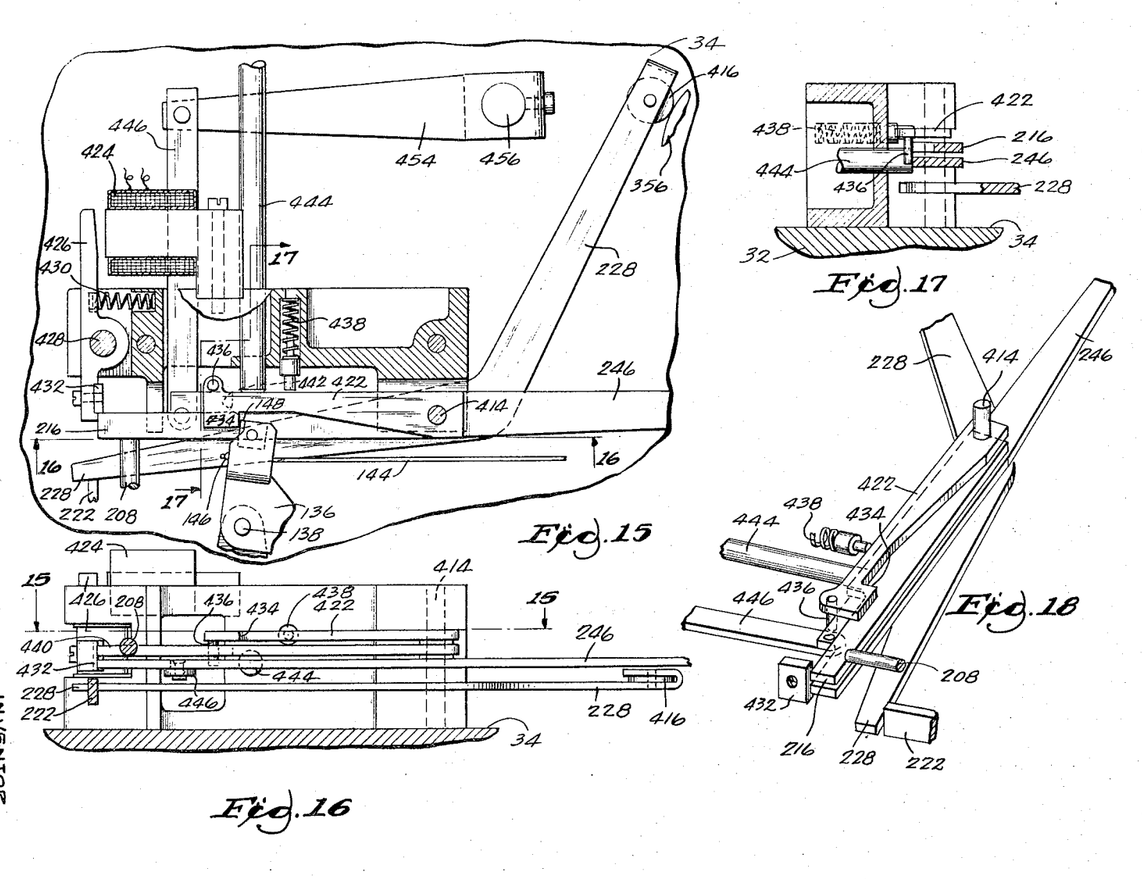
FIGURE 15 is a partial view of the wire cutting and stripping machine taken along line 15—15 of FIGURE 16, and showing the trip and reset mechanism employed therein.
FIGURE 16 is a partial view of the trip and reset mechanism taken along the plane indicated by the numerals 16—16 in FIGURE 15.
FIGURE 17 is a partial cross sectional view of the trip and reset mechanism taken along line 17—17 of FIGURE 15 and showing the interconnection of certain levers and bars employed in the mechanism.
FIGURE 18 is a partial perspective view of the levers and bars employed in the trip and reset mechanism of the wire cutting and stripping machine including certain other components of the mechanism which operate on or are operated by the levers and/or bars.

Cam 356, which is the cam keyed to shaft 326, operates left hand wire holder 192 by means of lever 228 pivoted in deck 34 on pin 414, and having roller 416 mounted on the end thereof adjacent the cam. (See FIGURE 15.) The other end of lever 228 abuts the end of bar 222 to push hammer 220 away from anvil 218 to release wire holder 192. Lever 228 is swung away from the end of bar 222 by cam 356 to allow hammer 222 to be driven rearward by spring 226 to pinch wire 87 between the hammer and anvil 218.

Cam 418, the remaining cam in the tier of cams, controls the movement of cable 144 which pivots wire feed means 88 and 90 toward each other to engage wire 87 to transport it through wire cutting and stripping machine 30. Referring to FIGURE 23, cam 418 is shown in plan view along with lever 164 and cable 144. One end of lever 164 is mounted on pivot 280 on the rear edge of deck 34. The other end is fastened to cable 144. Intermediate the two ends of lever 164 is roller 420 which rides on cam 418. As cam 418 rotates, in a clockwise direction as shown in FIGURE 23, the rise of the cam in the latter part of such rotation causes the forward end of lever 164 to move to the right, pivoting wire feed means 88 and 90 from the position shown in FIGURE 5 to the position shown in FIGURE 2 in the manner previously described. This causes the wire feed means to engage wire 87 and transport it through wire cutting and stripping machine 30. The final portion of the rise of cam 418 causes lever 164 and arm 140 of lever 136 to move further to the right to place hardened metal insert 148 into locking notch 434 on bar 422 to lock wire feed means 88 and 90 in the wire engaging position. The rise of cam 418 terminates in a steep slope to decrease the pull on cable 144 after lever 136 is secure in locking notch 434.

The trip and reset mechanism of wire cutting and stripping machine 30 trips the wire cutting and insulation severing elements and the wire stripping means when the desired length of wire 87 has been transported through the machine to cut the wire and strip its separated portions. The mechanism also resets wire cutting and stripping machine 30 for subsequent operations.

The trip and reset mechanism of wire cutting and stripping machine 30 includes a solenoid 424 mounted on the left side of frame 30. The solenoid is actuated by the measuring apparatus associated with the wire cutting and stripping machine which supplies a signal to the machine when the desired length of wire has been transported through the wire cutting and stripping machine.

The armature for solenoid 424 comprises lever 426 pivoted on pin 428 in frame 30. Armature lever 426 is spring biased into the extended position by spring 430 which bears on one end of lever 426 between pin 428 and solenoid 424. The other end of lever 426 contains a hardened metal stop 432 which engages other members of the trip and reset mechanism. Such other members include a plurality of levers and bars, the configuration and operational relationship of which are shown in FIGURES 15 through 18. Considering first the uppermost bar, this bar 422 has been previously noted in connection with lever 136 mounted on wire feed means 90. Bar 422 is pivotally mounted on pin 414 and contains notch 434 which engages insert 148 on arm 140 of lever 136. The other side of bar 422 contains a downwardly extending pin 436 which engages certain other levers. Pin 436 is held in such engagement by a weak spring 438 which bears on lever 422 and overcomes the friction of bar 422 on pivot 414.

Bar 440 lies immediately below bar 422 and is also pivoted at one end on pivot 414. The other end of bar 440 is held by stop 432 and that end of the bar contains a cut-out portion 442 so that when bar 440 is held against stop 432 it does not engage pin 436. A reset rod 444 abuts one side of bar 440 adjacent cut-out portion 442 while shaft 208 of the left hand wire lock 194 abuts the bar from the other side.

Level 246 lies immediately below bar 440 and is pivoted on pin 414. One end of lever 246 abuts stop 432 while the other end extends across wire cutting and stripping machine 30 and operates right hand wire lock 195 on right hand stripping arm 300. Near the end of lever 246 abutting stop 432 is a link 446 which is connected to clutch operating lever 352 in a manner hereinafter described. Reset rod 440 also abuts lever 246.

Reset rod 444 extends to the rear of wire cutting and stripping machine 30 and is fastened to one end of lever 448 extending across the back of the machine. The other end of lever 448 includes a roller 450 which engages cam 392 as shown in FIGURE 11. The lever 448 is pivoted intermediate its ends at pin 452.

Link 446, fastened to lever 246, also extends to the rear of wire cutting and stripping machine 30 and is fastened to a lever 454 mounted on the upper end of shaft 456 which is journalled in deck 34. The lower end of shaft 456 is coupled to an end of clutch operating lever 352 so that movement of link 446 causes clutch operating lever 352 to move out of engagement with stop 350.

The initial step in the operation of wire cutting and stripping machine 30 consists of transporting the desired length of wire 87 through the cutting and stripping machine in preparation for the cutting and stripping operation. To accomplish this, motor 36 is turned on to drive wire feed means 88 and 90 which are pivoted toward each other so as to engage wire 87 and move the wire through the machine. The hammers 204 and 228 of left hand wire lock 194 and right hand wire lock 195 are moved away from the respective anvils as is hammer 220 of left hand wire holder 192, to release wire 87. Wire guide tube 168 is in the forward or right position, between retracted tool holders 250 and 252 to facilitate transporting of the wire. The trip and reset mechanism is unactuated and shaft 326 containing the tier of cams is stationary. FIGURES 1 and 2 show the wire cutting and stripping machine in this initial step.

When the desired length of wire, as determined by the associated wire measuring apparatus, has been transported through the wire cutting and stripping machine 30, a pulse signal is supplied from the measuring apparatus to solenoid 424 to trip the trip and reset mechanism. Actuation of solenoid 424 pivots armature lever 426 of that solenoid to the retracted position and removes the hardened metal stop 432 from engagement with lever 246 and bar 440 to initiate operation of the cutting and stripping machine. With stop 432 removed, the ends of bar 440 and lever 246 are free to rotate rearwardly on pivot 414. Bar 440 is pivoted rearwardly by the force of spring 212 on shaft 208 of left hand wire lock 194 which abuts bar 440. The rearward movement of shaft 208 due to the removal of stop 432 from bar 440 allows hammer 204 to move toward anvil 196 and pinch wire 87. This sets left hand wire lock 194. Lever 246 is pivoted by spring 244 on shaft 240 of right hand wire lock 195. This spring drives hammer 228 forward toward anvil 226 and sets the right hand wire lock 195. The rearward pivoting of lever 246 also moves bar 422 rearwardly due to pin 436 which abuts the lever. The rearward movement of bar 422 moves hardened metal insert 148 out of notch 434 allowing wire feed means 88 and 90 to pivot away from each other and disengage the wire. This causes a cessation of the wire transport. FIGURE 5 shows, in detail, the wire feed means 88 and 90 in this position and stop 148 moved out of engagement with notch 434. At this point then, the transporting of wire through machine 30 has ceased and the wire is held firmly in position in the machine by left hand wire lock 194 and right hand wire lock 195.

The rearward pivoting of lever 246 also moves link 444 rearward which, through lever 454, rotates shaft 456 and moves clutch operating lever 352 out of engagement with stop 350 permitting clutch 330 to engage. The engagement of clutch 330 causes shaft 326 and the tier of cams mounted thereon to rotate.

Figure 24:
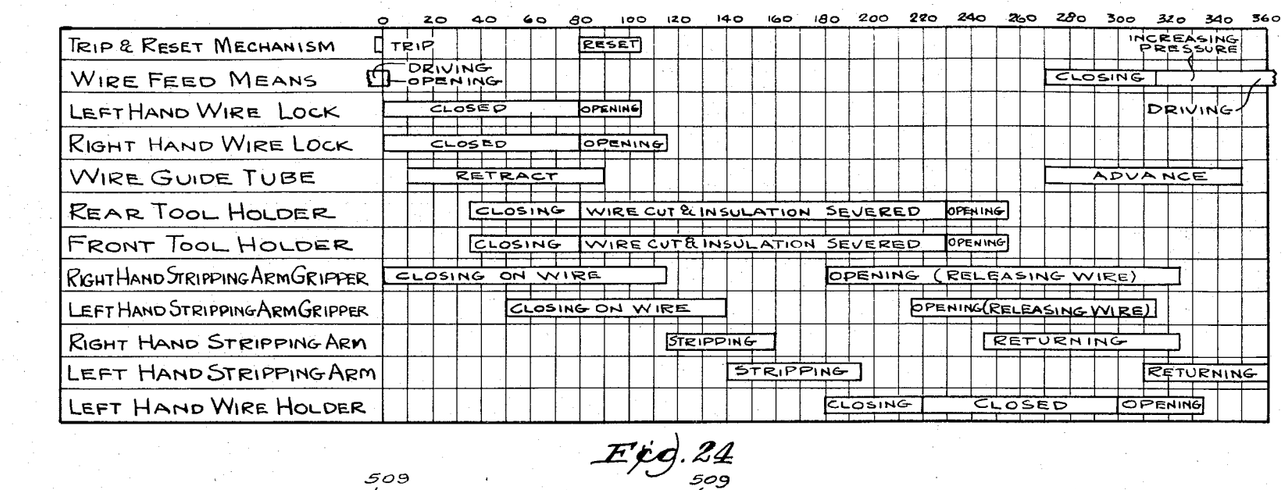
FIGURE 24 is a sequence diagram showing the operative cycle of the wire cutting and stripping machine.

The operation of wire cutting and stripping machine 30, after the trip and reset mechanism has been energized and during the time shaft 326 and the cams mounted thereon are rotating, is summarized in FIGURE 24 which graphically illustrates the operation of the various elements of the machine. Starting at the left side of the graph, at 0 degrees of revolution, the above described operating sequences will have been completed or will be completed shortly thereafter. That is, wire feed means 88 and 90 will have disengaged wire 87 to stop the transport of the wire through the machine, left hand wire lock 194 and right hand wire lock 195 are both closed to hold the wire in position and prevent its movement and clutch 330 has just engaged.

After shaft 326 has rotated approximately 10 degrees, cams 370 and 372 cause crescent shaped lever 190 to begin to retract wire guide tube 168 from its right position between tool holder 250 and 252 to its left position between wire feed means 88 and 90. These wire feed means have been pivoted away from each other to permit the wire guide tube to fit between them. As wire 87 is tightly held by left hand wire lock 194 and right hand wire lock 195, the movement of wire guide tube 168 along the wire does not alter its position. The retraction of wire guide tube 168 permits tool holders 250 and 252 to begin to close toward each other to cut wire 87 and sever the insulation surrounding its conductor. The retraction of wire guide tube 168 continues for approximately 80 degrees of rotation.

Eccentric cams 410 and 412 cause the right hand and left hand stripping arm grippers 286 and 302 to commence moving toward wire 87 in preparation for the stripping operation. Eccentric cams 410 and 412 drive common mounting structure 312 forward, which in turn drives grippers 286 and 302 forward by means of links 308 and 310. Due to the eccentric action of common mounting structure 312 caused by the rotation of cams 410 and 412 mounted therein, right hand gripper 286 will close on and engage wire 87 prior to left hand gripper 302. This allows sufficient time for wire guide tube 168 to move to the left of the left hand stripping arm 294. Grippers 286 and 302 close on wire 87 for approximately the first 120 degrees of cam rotation.

Cams 390 and 392 cause tool holders 250 and 252 to start closing toward each other after 35 degrees of cam revolution, that is, cam 390 drives rear tool holder 252 forward by means of bar 272 and cam 392 drives forward tool holder 250 rearwardly by means of plate 274. After shaft 326 has rotated approximately 80 degrees, blades 254, 256 and 260 through 266 have engaged wire 87 and have cut the wire and severed its insulation. At this point, left hand wire lock 194 and right hand wire lock 195 may be released. This release is provided by a forward movement of reset rod 444 provided by cam 392 operating on lever 488. Reset rod 444 bears on bar 422 and lever 246 and the forward movement of the rod pivots the free ends of bar 442 and lever 246 forward. Bar 442 pushes shaft 208 forward and moves hammer 204 away from anvil 196, thereby releasing left hand wire lock 194. The movement of lever 246 causes the end of the lever in contact with roller 248 on strap 230 to move rearwardly, moving hammer 286 away from anvil 226 and releasing that wire lock. Spring 430 pushes stop 432 on armature lever 426 in the rearward path of bar 422 and lever 246 insuring that left hand wire lock 194 and right hand wire lock 195 remain released.

The cutting and stripping blades remain in the closed position for approximately 130 degrees of cam rotation. However, the cutting of wire 87 and the severing of its insulation takes place immediately upon the closure of the blades, or after shaft 326 has rotated approximately 100 degrees from its initial position. After the wire has been cut and the insulation severed, the stripping operation may begin. Hence, after shaft 326 has rotated approximately 120 degrees, eccentric cams 410 and 412 will have driven grippers 286 and 302 securely into engagement with wire 87 so as to pinch the wire between the grippers and anvils 226 and 298. The further forward movement of common mounting structure 312 and links 308 and 310, caused by the continued rotation of the eccentric cams through the 60 degree arc from approximately 120 degrees up to approximately 180 degrees, will cause right hand stripping arm 300 to move to the right and left hand stripping arm 294 to move to the left, withdrawing the separated portions of wire 87 from the severed pieces of the insulation and exposing the bare end of the conductor. The severed pieces of insulation fall through chute 270 of frame 32 for disposition.

Once the ends of cut wire 87 have been stripped, grippers 286 and 302 on the stripping arms 300 and 294 start to release wire 87 to allow it to fall from the machine. This occurs after eccentric cams 410 and 412 have rotated approximately 220 degrees from their initial position. Just prior to the time grippers 286 and 302 release wire 87, left hand wire holder 192 is applied to insure that at all times at least one element of the wire cutting and stripping machine 30 has a positive hold on the wire, thereby insuring accurate cutting and stripping of the wire. Cam 356 moves the end of lever 228 abutting bar 222 rearwardly, allowing spring 226 to drive hammer 220 against anvil 218, and hold the wire. Left hand wire holder 192 remains applied for approximately 80 degrees of cam rotation and until wire feed means 88 and 90 have engaged wire 87 to again commence transporting it through wire cutting and stripping machine 30.

After grippers 286 and 302 are retracted, and left hand wire holder 192 has been applied, stripping arms 300 and 294 may be returned to their initial position. This is accomplished by the continued rearward movement of common mounting structure 312 afforded by eccentric cams 410 and 412. Once grippers 286 and 302 have been withdrawn to the maximum extent, the rearward movement of links 308 and 310 swings right hand stripping arm 300 to the left and left hand stripping arm 294 to the right.

At about 290 dgerees of rotation of shaft 326, crescent shaped lever 190, under the influence of cams 370 and 372, advances wire guide tube 168 to its far right position in preparation for transporting another length of wire.

Also, at about 270 degrees of rotation of shaft 326, cam 418 begins to move the forward end of lever 164 and cable 144 to the right. This causes wire feed means 88 and 90 to pivot toward each other and engage wire 87 to move it from left to right through wire cutting and stripping machine 30. Insert 148 is pulled to the right past locking notch 434. The free end of bar 422 is pushed forward by spring 438, so that when the roller on lever 164 falls off the rise on cam 418, moving cable 144 to the left, insert 148 fits into notch 434 latching the wire feed means 88 and 90 in a position to engage wire 87.

After shaft 326 has rotated 360 degrees, clutch operating lever 352 disengages clutch 330 by striking stop 350 on sleeve 344, arresting the movement of shaft 326 and completing the operative cycle of wire cutting and stripping machine 30.

Figure 25:
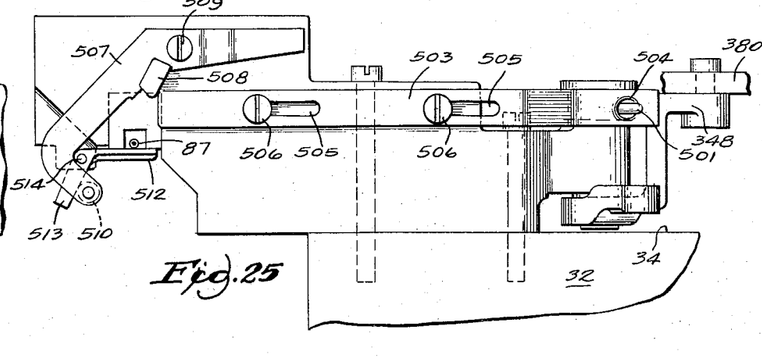
FIGURE 25 is a fragmentary view of the wire supporting mechanism as viewed from the right hand side of FIGURE 2.
Figure 26:
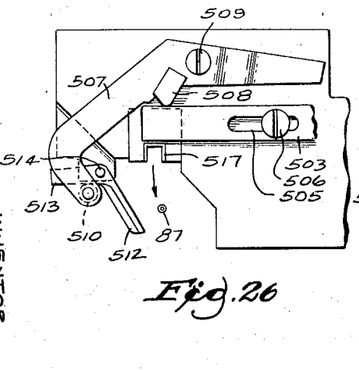
FIGURE 26 is another fragmentary view of a portion of the wire supporting mechanism as viewed in FIGURE 25 but showing the wire supporting platform tripped to release the wire.

Now, referring to the wire supporting mechanism, such mechanism is shown particularly in FIGURES 2, 25 and 26. As shown, the wire support is actuated in timed relation with the wire feeding, cutting, and stripping mechanisms through the expedient of a lever 500 secured to bell crank 384 and operated by the second cam from the top (FIGURE 22). The lever 500 has a finger 501 projecting outwardly therefrom through an aperture 504 in a motion transmitting slide 503 mounted on the frame 32 as by means of bolts or screws 506 received in elongated slots 505 formed in the slide 503. The end of slide 503, remote from the aperture 504, coacts with a trigger 508 formed on a crescent shaped trip lever 507 pivotally mounted at 509 on the frame 32, and the trip lever 507 has a roller 510 at one end which rides on the trip leg or trigger 513 of a wire supporting platform 512 pivotally mounted at 514. The wire supporting platform 512 provides a floor for the tapered wire receiving opening or tunnel 517 in the nose piece 516 when in the position shown in FIGURE 25, and after the wire 87 has been cut and stripped, the platform is swung to the open position shown in FIGURE 26 to release the wire. A coil spring 519 or the like (FIGURES 2 and 10) constantly urges the platform 512 to its wire supporting position, and the lever 507 when acted upon by the slide 503 overcomes the action of the spring 519 to trip the platform 512.

Thus, the lever 500 is swung about its pivot in timed relation to the wire feed, stripping and cut-off operations through its linkage with cam 382. The lever 500, in turn, actuates the slide 503 which is retained in the position shown in FIGURE 25 during the wire feeding and cutting and stripping operations. As each length of wire is cut, the slide 503 is actuated by lever 500 to act on trigger portion 508 of trip lever 507 as shown in FIGURE 26. As the lever 507 is swung clockwise, the platform 512 is also swung clockwise by roller 510 acting on leg 513 to release the severed section of wire 87.

Various modes of carrying out the invention are contemplated as being within the scope of the following claims particularly pointing out and distinctly claiming the subject matter that is regarded as the invention.

I claim:

1. In a wire cutting and stripping machine, driving means, wire cutting and stripping means operable by said driving means, and transport means driven by said driving means to convey wire to the cutting and stripping means, said transport means comprising, wire feed means selectively engaging said wire, means for driving said wire feed means at variable speeds, and a reciprocable wire guide movable toward said cutting and stripping means to guide the wire thereto and movable away from said cutting and stripping means during the cutting and stripping operation.

2. A wire cutting and stripping machine according to claim 1, wherein said wire feed means comprises a pair of endless belts having opposed wire engaging faces and movable to engage said wire.

3. A wire cutting and stripping machine according to claim 1, wherein a wire clamping means is provided in the path of movement of the wire to prevent displacement of said wire during the cutting and stripping operation.

4. A wire cutting and stripping machine according to claim 3, wherein a wire holding means is provided in the path of movement of the wire to prevent displacement of the wire when the wire guide is moving toward said cutting and stripping means.

5. A wire cutting and stripipng machine according to claim 4, wherein at least one of said cutting and stripping means, said wire clamping means, and said wire holding means is in contact with said wire at all times to insure accurate cutting and stripping of the wire.

6. A wire cutting and stripping machine according to claim 1, wherein said wire guide is a tubular member movable toward and away from said cutting and stripping means along the axial path of said wire as it is advanced through said machine.

7. A wire cutting and stripping machine according to claim 6, wherein said tubular wire guide is reciprocated toward and away from said cutting and stripping means by an endless cable secured to the wire guide and operably associated with the cutting and stripping means.

8. A wire cutting and stripping machine according to claim 1, wherein the cutting and stripping means includes a shaft mounting a tier of cams selectively rotatable by said driving means to operate said wire feed means, said wire guide, and said cutting and stripping means in timed relation to cut and strip said wire.

9. The machine of claim 1, wherein wire supporting means operating in timed relation with the wire transport means and the wire cutting and stripping means is provided beyond the cutting and stripping zone, the wire supporting means being actuated to release the wire as it is cut.

10. In a wire cutting and stripping machine, driving means, wire cutting and stripping means operable by said driving means, transport means driven by said driving means to convey wire to said cutting and stripping means, wire clamping means located in the path of movement of said wire, a trip mechanism cooperable with said transport means and with said clamping means to interrupt the wire conveying operation and cause said clamping means to hold said wire in position whenever a predetermined length of wire has been conveyed to said cutting and stripping means, and means for causing said transport means to re-engage said wire and said clamping means to release the same for the performance of subsequent operations.

11. A wire cutting and stripping machine according to claim 10, wherein the transport means includes a pair of endless belts having opposing wire engaging faces.

12. A wire cutting and stripping machine according to claim 11, wherein the endless belts are mounted for swinging movement toward and away from each other to selectively engage and disengage the wire.

13. A wire cutting and stripping machine according to claim 10, wherein a wire holding means is provided for preventing displacement of the wire prior to commencement of the wire conveying operation.

References Cited
UNITED STATES PATENTS

| | | | |
|---|---|---|---|
| 2,884,825 | 5/1959 | Eubanks | 81—9.51 |
| 3,199,383 | 8/1965 | Gudmestad | 81—9.5 |
| 3,267,556 | 8/1966 | Scharf | 81—9.51 |
| 3,316,781 | 5/1967 | Bignell et al. | 81—9.51 |

MILTON S. MEHR, *Primary Examiner.*